US008427682B2

(12) United States Patent  (10) Patent No.: US 8,427,682 B2
Nishimura  (45) Date of Patent: Apr. 23, 2013

(54) INFORMATION PROCESSING DEVICE THAT PERFORMS DATA ACCESS CONTROL THROUGH CONNECTING TO MULTIPLE DEVICES AND METHOD THEREOF

(75) Inventor: Hironobu Nishimura, Tokyo (JP)

(73) Assignee: Oki Data Corporation, Tokyo (JP)

( * ) Notice: Subject to any disclaimer, the term of this patent is extended or adjusted under 35 U.S.C. 154(b) by 477 days.

(21) Appl. No.: 12/728,481

(22) Filed: Mar. 22, 2010

(65) Prior Publication Data

US 2010/0245905 A1   Sep. 30, 2010

(30) Foreign Application Priority Data

Mar. 30, 2009 (JP) ................. 2009-081385

(51) Int. Cl.
G06F 3/12 (2006.01)
G06F 15/167 (2006.01)
G06F 15/16 (2006.01)
G06K 15/00 (2006.01)
H04N 1/46 (2006.01)

(52) U.S. Cl.
USPC .......... 358/1.15; 358/1.1; 358/1.16; 358/508; 709/212; 709/216; 709/217

(58) Field of Classification Search ............... 358/1.15, 358/1.1, 1.16, 1.9, 3.23, 3.24, 401, 403, 501, 358/508, 538; 709/212, 216, 217; 715/200, 715/204, 274, 700, 736, 738, 740, 741, 745, 715/748, 751, 769, 283
See application file for complete search history.

(56) References Cited

U.S. PATENT DOCUMENTS

2006/0239708 A1 * 10/2006 Kozuka et al. ................. 399/75

FOREIGN PATENT DOCUMENTS

| JP | 2001-022679 A | 1/2001 |
| JP | 2003-174564 A | 3/2003 |
| JP | 2006-053946 A | 2/2006 |
| JP | A-2006-092296 | 4/2006 |
| JP | 2006-323680 A | 11/2006 |
| JP | 2007-069388 A | 3/2007 |
| JP | 2008-186164 A | 8/2008 |

OTHER PUBLICATIONS

Wikipedia Encyclopedia, Transmission Control Protocol, Feb. 2009, Wikipedia Encyclopedia, all pages.*

* cited by examiner

Primary Examiner — Benny Q Tieu
Assistant Examiner — Ngon Nguyen
(74) Attorney, Agent, or Firm — Posz Law Group, PLC

(57) ABSTRACT

An information processing device transmits and receives information to and from plural devices, which are coupled to the information processing device. A memory unit stores a control program that corresponds to each of the devices. An acquisition unit acquires device information from a selected one of the devices. A determination unit determines whether the selected device is controllable based on the acquired device information. A reading unit reads a control program from the memory unit that corresponds to the selected device, if the determination unit determines that the selected device is controllable. A command generation unit of the relevant control program generates commands for the selected device. A transmission control unit transmits commands generated by the command generation unit to the corresponding device. The transmission control unit transmits a set of the commands generated by the command generation unit in a block.

15 Claims, 11 Drawing Sheets

| Class | Name | Command Type | Command |
|---|---|---|---|
| 1 | A Command | Type1 | Command A |
| 1 | B Command | Type2 | Command B |
| 1 | C Command | Type1 | Command C |
| 2 | X Command | Type3 | Command X |
| 2 | Y Command | Type4 | Command Y |
| 2 | Z Command | Type1 | Command Z |

Command A = Setting Value 1

Command C = Setting Value 2

Command X = Setting Value 5

Command Z = Setting Value 1

Fig. 9A

Command A

Command C

Command X

Command Z

Setting Value 1

Setting Value 2

Setting Value 5

Setting Value 1

[Setting Value Group 1]

CMD1 = Type1, Name, Command A

CMD2 = Type2, Name, Command B

CMD3 = Type1, Name, Command C

[Setting Value Group 2]

CMD1 = Type3, Name, Command X

CMD2 = Type4, Name, Command Y

CMD3 = Type1, Name, Command Z

INFORMATION PROCESSING DEVICE THAT PERFORMS DATA ACCESS CONTROL THROUGH CONNECTING TO MULTIPLE DEVICES AND METHOD THEREOF

CROSS REFERENCE

The present application is related to, claims priority from and incorporates by reference Japanese patent application number 2009-081385, filed on Mar. 30, 2009.

TECHNICAL FIELD

The present invention relates to an information processing device that performs data access control through connecting to multiple devices, and to the method thereof.

BACKGROUND

A technology in which a conventional information processing device (for example, a personal computer) that connects to multiple devices (external devices) obtains information by accessing these devices and performs data processing is widely known (for example, see Japanese laid-open patent application number 2006-92296). When the information processing device performs data processing, the information processing device accesses data through a control program that corresponds the device and a data object that corresponds to the data to be accessed.

However, the control program is a device-specific program. Every time the device to be accessed is changed, a user searches for a control program that corresponds to the changed device to be controlled in the information processing device and runs the control program. This is burdensome for the user.

An object of the present invention is to provide an information processing device that can control a target device with simple operation and without a significant burden on the user.

Accordingly, an information processing device that transmits and receives information to and from plural devices that are coupled to the information processing device in the present application includes: a memory unit storing a control program that corresponds to each of the devices; an acquisition unit for acquiring device information from a selected one of the devices; a determination unit for determining whether the selected device is controllable based on the acquired device information; a reading unit for reading a control program from the memory unit that corresponds to the selected device, if the determination unit determines that the selected device is controllable; a command generation unit for generating commands for the selected device using the control program read by the reading unit; and a transmission control unit for transmitting commands generated by the command generation unit to the corresponding device, wherein the transmission control unit transmits a set of the commands generated by the command generation unit in a block.

In another aspect, an information processing device that transmits and receives information to and from plural devices that are coupled to the information processing device in the present application includes: a memory unit for storing control programs that correspond to each of the devices; a command memory unit for storing command sets that correspond to each of the devices; an acquisition unit for acquiring device information from a selected one of the devices; a determination unit for determining whether the selected device is controllable based on the acquired device information; a reading unit for reading one of the control programs from the memory unit and one of the command sets from the command memory unit that correspond to the selected device, if the determination unit determines that the selected device is controllable; a command generation unit for generating commands for the selected device using the control program and command set that are read by the reading unit; and a transmission control unit for transmitting the commands generated by the command generation unit to the corresponding device, wherein the transmission control unit transmits a set of commands generated by the command generation unit in a block.

In another aspect, the present application discloses a method of operating an information processing device that transmits and receives information to and from plural devices that are connected to the information processing device, wherein the method including: storing a control program that corresponds to each of the devices in a memory unit; acquiring device information from a selected one of the devices; determining whether the selected device is controllable based on the acquired device information; reading a control program that corresponds to the selected device from a memory unit, if the determination unit determines that the selected device is controllable; generating commands for the selected device; and transmitting the generated commands to the corresponding device in a block.

In the present invention, a control program, which corresponds to device information obtained from a target device to be controlled, is automatically selected from control programs stored in advance in a memory unit and is executed. Therefore, a user can control the target device with simple operation by specifying the device to be controlled. When a control program is added, a completely new device that has a different specification can easily be controlled. Because a set of commands is transmitted in a block (or a unit) to the device without a transmission check for each command according to one transmission instruction at the time of data transmission, effective data communication is performed.

BRIEF DESCRIPTION OF THE DRAWINGS

FIGS. 9A and 9B are schematic views of examples of command data.

FIG. 13 is a schematic view of a configuration for a command definition file.

DETAILED DESCRIPTION

Figure 2:
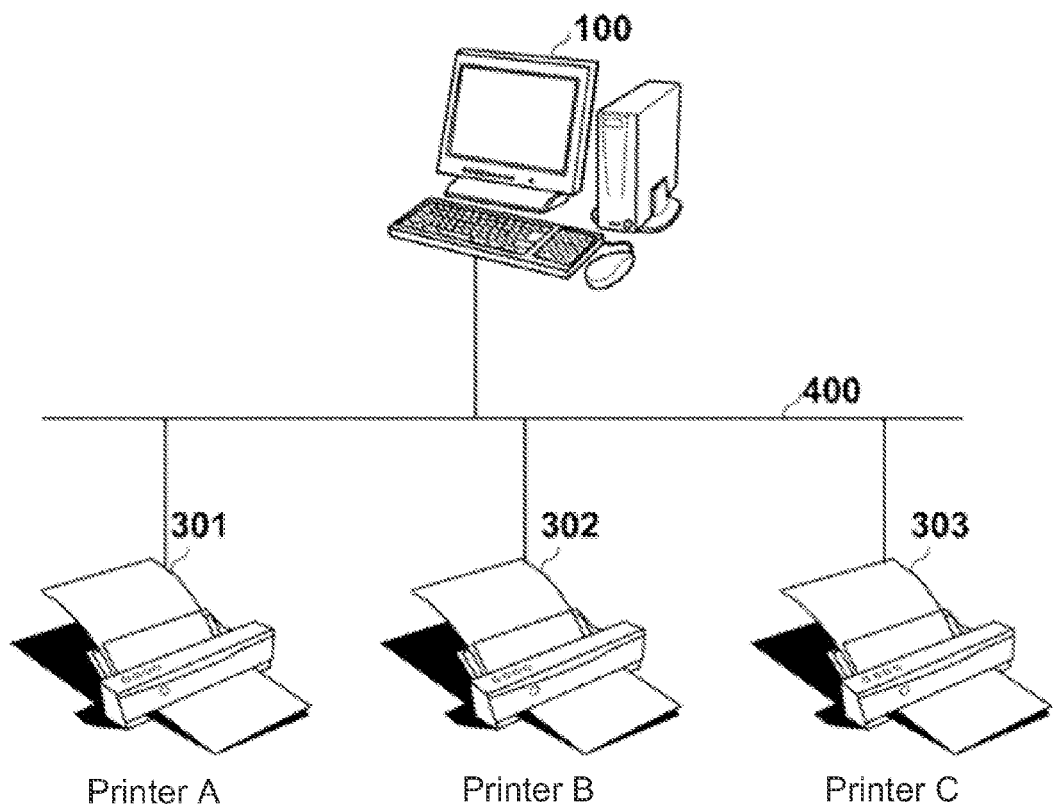
FIG. 2 is a schematic view of hardware of an information processing system according to an embodiment of the present invention.

Next, a embodiment according to the present invention is explained based on FIG. 2. An information processing system according to the present embodiment is configured with a PC (personal computer) as an information processing device 100, and plural devices (printers) 301-303 that are connected to a connection port (not shown) of the PC 100 through a connection interface 400 (for example, local interfaces, such as a line print terminal (LPT), a universal serial bus (USB), or the like, or a network interface).

First Embodiment

Figure 1:
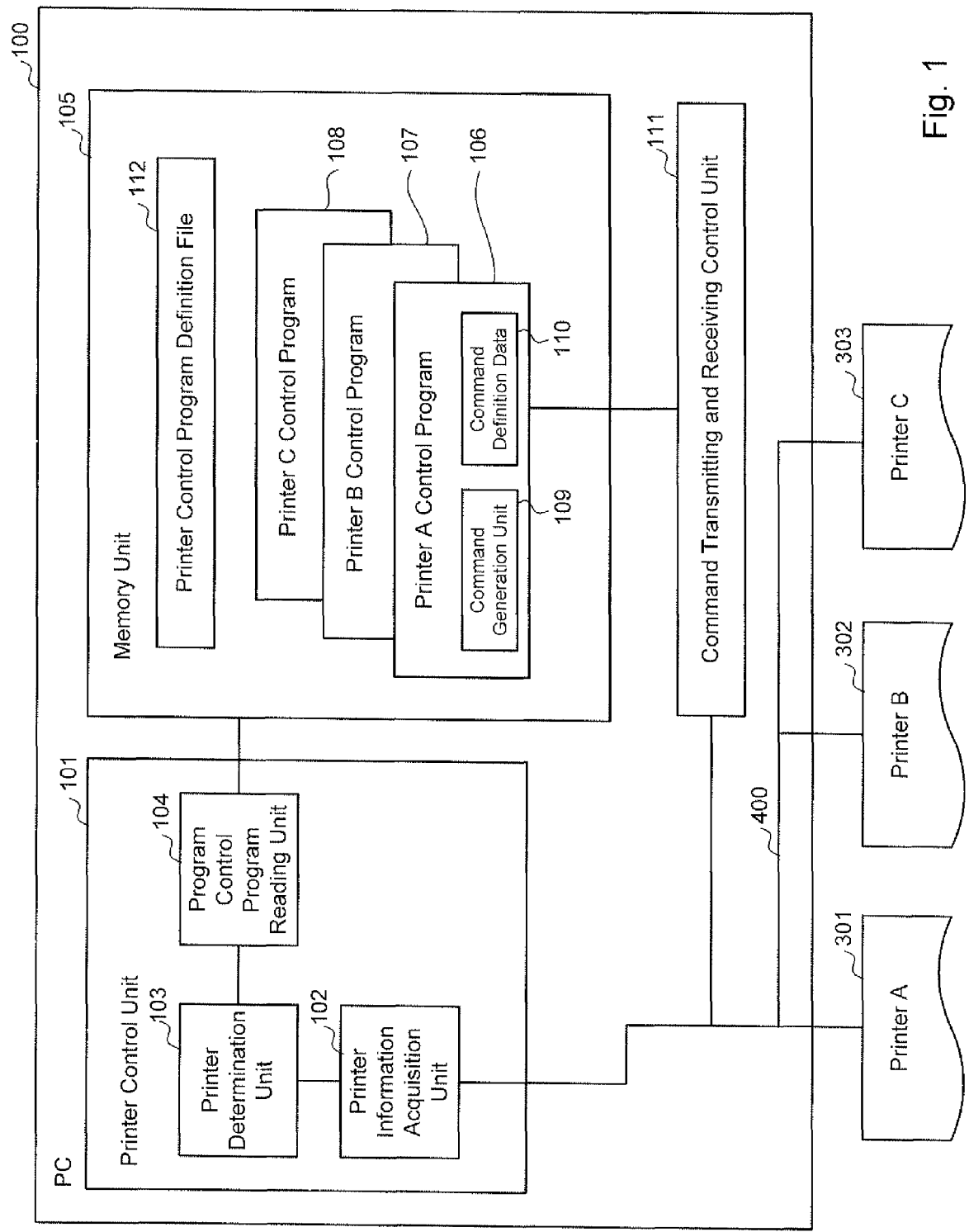
FIG. 1 is a block diagram of an information processing system according to a first embodiment.

As shown in FIG. 1, the information processing device, or PC, 100 according to the first embodiment has a printer control unit 101, a memory unit 105, and a command transmitting and receiving control unit 111. The printers 301-303, which have different specifications from one another, are connected to the connection port of the PC 100 through the connection interface 400.

The printer control unit 101 has a printer information acquisition unit 102, a printer determination unit 103, and a printer control program reading unit 104. The printer information acquisition unit 102 acquires printer information (for example, the model name and device unique number) from the printers 301-303 connected to the PC 100. The printer determination unit 103 determines whether or not a printer is controllable by the PC 100 based on the printer information acquired by the printer information acquisition unit 102. The printer control program reading unit 104 reads a printer control program for controlling the printer that corresponds to a target printer to be controlled from the memory unit 105, which is discussed later, based on the printer information acquired by the printer information acquisition unit 102 when the printer determination unit 103 determines that the printer is controllable.

The printer information acquisition unit 102, the printer determination unit 103, the printer control program reading unit 104, and the command transmitting and receiving control unit 111, which are discussed above, are functional units of a program that are prepared to run, respectively, by starting up the PC 100.

Printer control programs 106-108, by which the above mentioned printers 301-303 are controlled, and a printer program definition file 112, in which information relating to the printer control programs 106-108 are written, are stored in the memory unit 105.

Figures 4, 5:
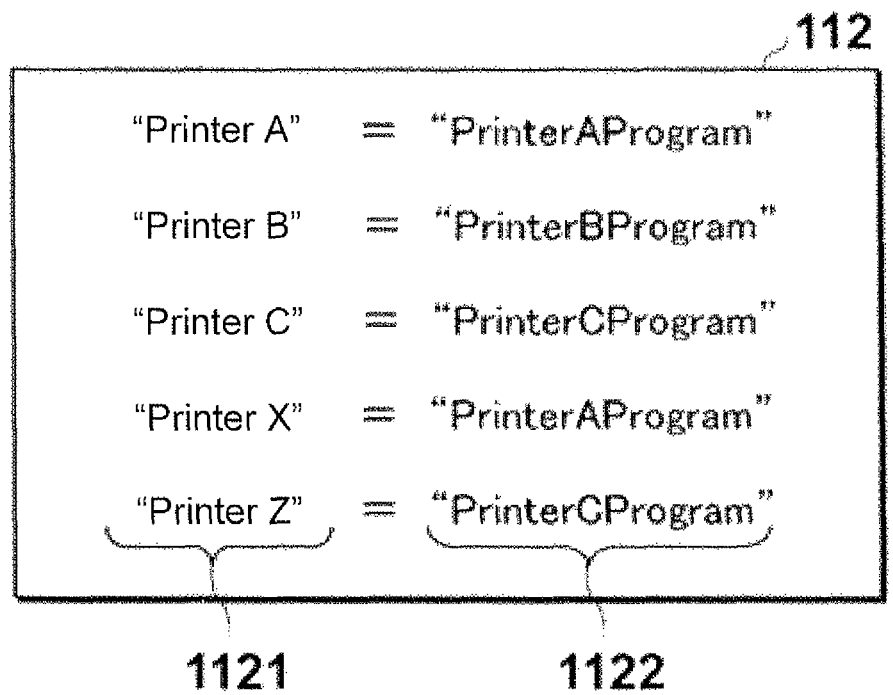
FIG. 4 is a schematic view of a configuration for a printer control program definition file.
FIG. 5 is a schematic view of a configuration for command definition data.

In FIG. 4, the reference numeral 1121 designates printer information (model name) acquired by the printer information acquisition unit 102. The reference numeral 1122 designates a program name (module name) of a printer control program that can control the printer corresponding to the printer information. The printer control program definition file is used when the printer determination unit 103 determines that a printer is controllable and when the printer control program reading unit 104 reads a printer control program for a target printer from the memory unit 105.

In FIG. 4, "PrinterAProgram" is assigned to a "Printer X," and "PrinterCProgram" is assigned to a "Printer Z." As explained above, when different printers can be controlled by the same definition file (command set), it is not necessary to add a new control program. Rather, when the existing printer control program is assigned, a new printer, such as the printers X and Z, can be controlled. A completely new printer that has a different specification can be controlled by updating the printer control program definition file 112 or by adding a new printer control program.

As shown in FIG. 1, each of the printer control programs 106-108 has a command generation unit 109 and command definition data 110. The command generation units 109 are functional units that are prepared to run by executing the corresponding printer control program 106-108 and each command generation unit generates a command that corresponds to printer control features that are desired by a user.

In the table of FIG. 5, the column labeled "class" shows groups to which a command belongs. A column labeled "command type" is a classification according to the contents of a command. At the time of command control, the command type (Types 1-4) that corresponds to a controlled feature of a target printer to be controlled is selected. A column labeled "command" shows printer control commands.

The command definition data 110 can be changed according to the specification of a printer to be controlled. For example, a "command" can be configured by data in table (spread sheet) format that combines a command and a setting value (for example, a setting for a sheet size, a selection of a sheet tray, and a setting for print density). Any command format is acceptable as long as the printer control program can see the contents.

The command transmitting and receiving control unit 111 is a functional unit to transmit a command that is generated by the command generation units 109 to target printers 301-303 to be controlled.

Figure 3:
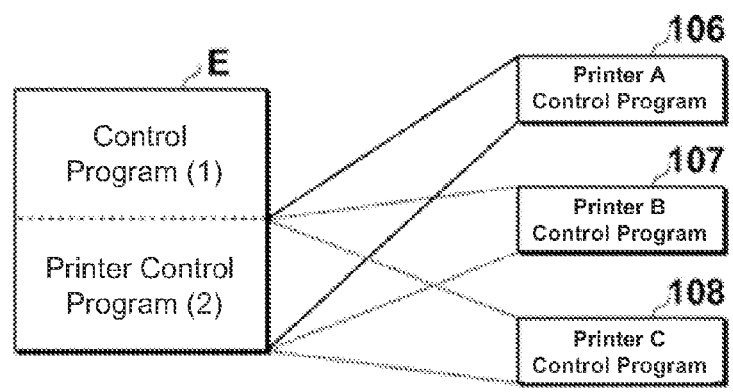
FIG. 3 is a schematic view illustrating reading of programs.

Next, based on FIG. 3, a method of reading a program for command control processing, which is discussed later, is explained.

When the PC 100 is started up, first, a control program (1) is expanded (loaded) in a program expansion area E (RAM) in the PC 100. When the control program (1) is executed, the printer control unit 101, which has the functional units of the printer information acquisition unit 102, the printer determination unit 103, and the printer control program reading unit 104, is prepared to run. Next, a printer control program (2) (one of 106-108) that corresponds to a printer selected by a user is read from the memory unit 105 and is expanded (loaded) at the tail of the control program (1). The printer selection is performed by assigning a connection port of the PC 100 by a user, and this process is discussed later.

When the user re-selects the connection port of the PC 100 to change a target printer to be controlled, the printer control program (2) that is expanded (loaded) in the program expansion area E first is revoked (unloaded), and a control program (printer control programs 106-108) for a newly selected printer is expanded (loaded) in that area as the printer control program (2). The expansion area for the printer control program (2) in the program expansion area E has no capacity restrictions and is automatically secured in its size according to the capacity of a load program.

Next, performance of command control, which is discussed above, is explained based on FIGS. 6-8 with reference to FIGS. 9 and 10. In the present embodiment, the process for changing a setting value of a printer is explained as an example of command control. The following process is performed by executing the control program (1) expanded (loaded) in the program expansion area E and the printer control program (2).

Figure 6:
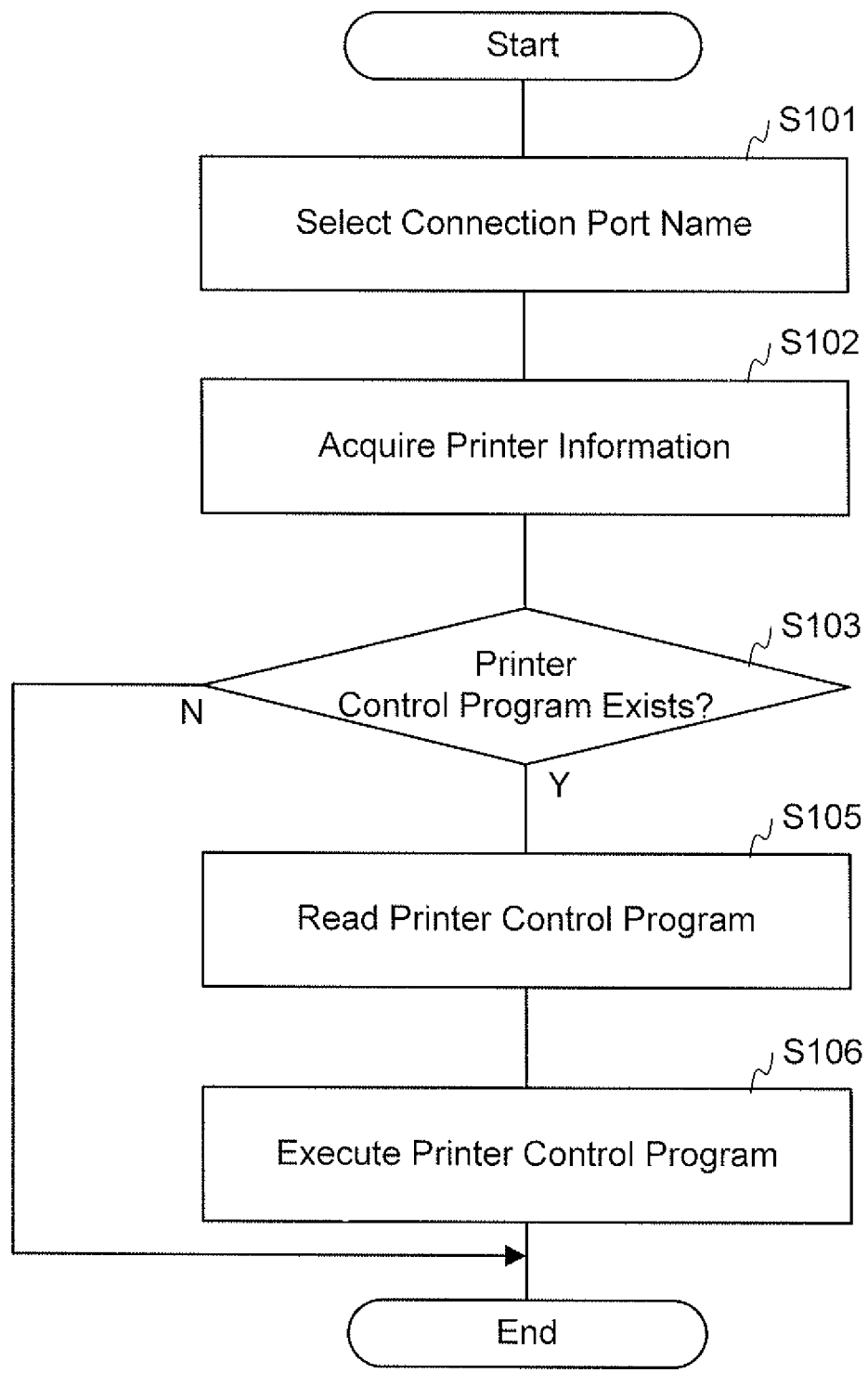
FIG. 6 is a flow diagram of a process of a printer control unit according to the first embodiment.

When a user starts up the PC 100, the control program (1) is run so that connection port names (LPT, USB, network, and so on) are listed and displayed at a display unit (monitor) of the PC 100. In FIG. 6, at S101, the user selects a connection port name for which the user wants to change a setting among plural connection port names displayed at the display unit by using an input device, such as a mouse or keyboard.

At S102, the printer information acquisition unit 102 acquires information (in this embodiment, model name) of the printer (one of the printers 301-303) that is connected to the connection port selected at S101. The acquired printer information is not limited to the model name. As long as a printer can be specified, mere symbols and numbers may be used.

At S103, the printer determination unit 103 determines whether or not the selected printer is controllable. Namely, by referring the printer control program definition file 112 in the memory unit 105, the printer determination unit 103 confirms whether or not the printer control program 106-108 that corresponds to the printer information acquired at S102 exists in the memory unit 105. When the corresponding printer control program exists, the printer determination unit 103 determines that the selected printer is controllable and proceeds to S105. When the corresponding printer control program does not exist, the printer determination unit 103 determines that the selected printer is not controllable and ends the procedure.

At S105, the printer control program reading unit 104 reads the corresponding printer control program among the printer control programs 106-108 that are stored in the memory unit 105 based on the printer control program definition file 112. As discussed above, the printer control program that is read is expanded (loaded) as the printer control program (2) at the tail of the control program (1) in the program expansion area E as shown in FIG. 3.

At S106, the printer control program that is read at S105 is executed. Then, the process ends.

Next, details of the process of S106 are explained with reference to FIG. 7.

Figure 7:
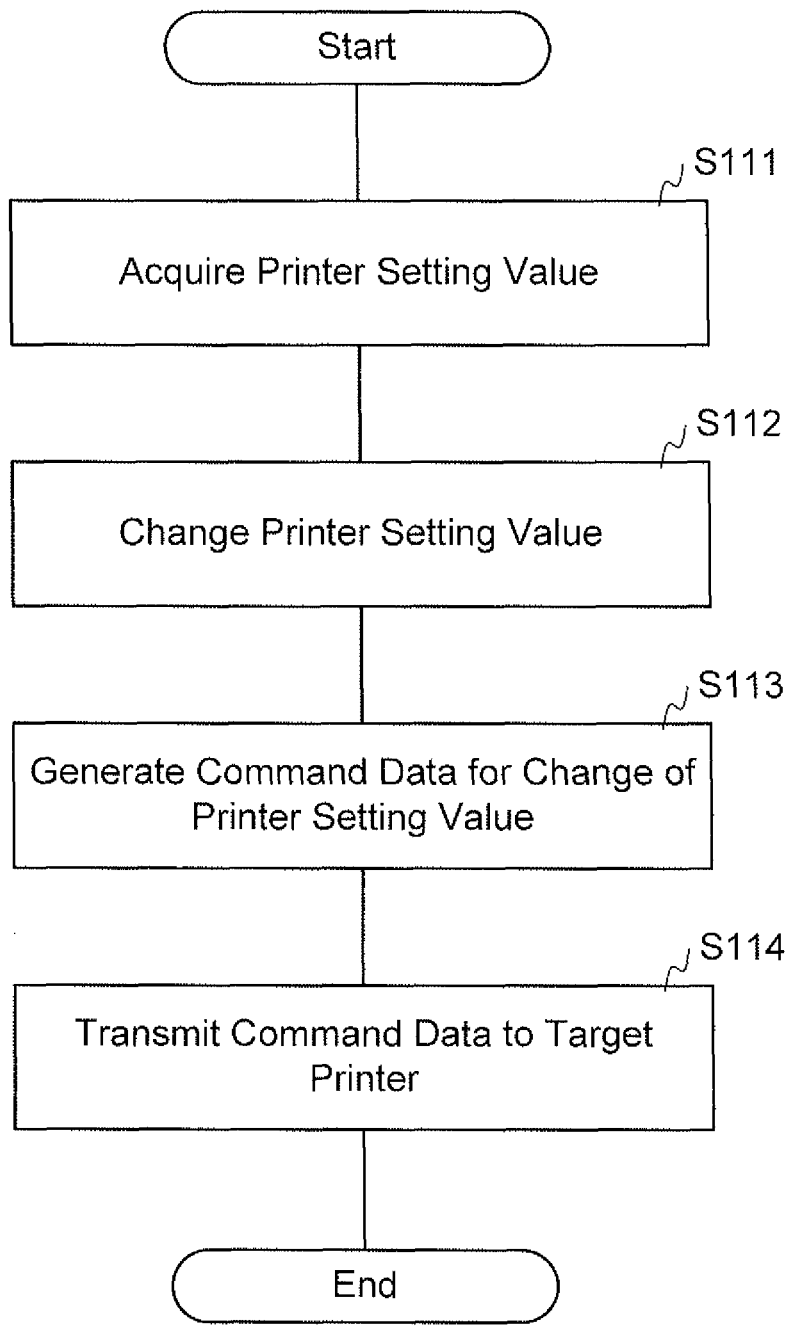
FIG. 7 is a flow diagram of printer control process according to the first embodiment.

In FIG. 7, at S111, the printer information acquisition unit 102 acquires a printer setting value, which is set in the target printer to be currently controlled.

At S112, the setting value acquired at S111 is displayed at the display unit of the PC 100 so that the user can change the displayed setting value with the input device (a mouse or keyboard).

At S113, the command generation unit 109 generates command data (see FIGS. 9A and 9B) for the change of the printer setting value based on information of the setting value that is to be changed at S112 with reference to the command definition data 110 in the printer control program.

At S114, the command transmitting and receiving control unit 111 transmits the command data that is generated at S113 to the target printer. Then, the process ends.

FIG. 9A is an example of data that is a combination of a command and a setting value. FIG. 9A shows an example of a set of command data in the form of one command per line of data. In the present embodiment, a break between commands is not limited to a line break as shown in FIG. 9A. Anything that is readable by a printer, such as a space, comma, and so on, can be used as a separator. FIG. 9B is an example of another group of command data in which a set of commands is listed (stored) first, and then setting values that correspond to each command are listed (stored). As discussed above, plural commands (A, C, X, and Z) are generated as command data that is transmitted to a target printer to be controlled with respect to the command control (changing a setting value).

Next, details of the process of S114 are explained with reference to FIG. 8.

Figure 8:
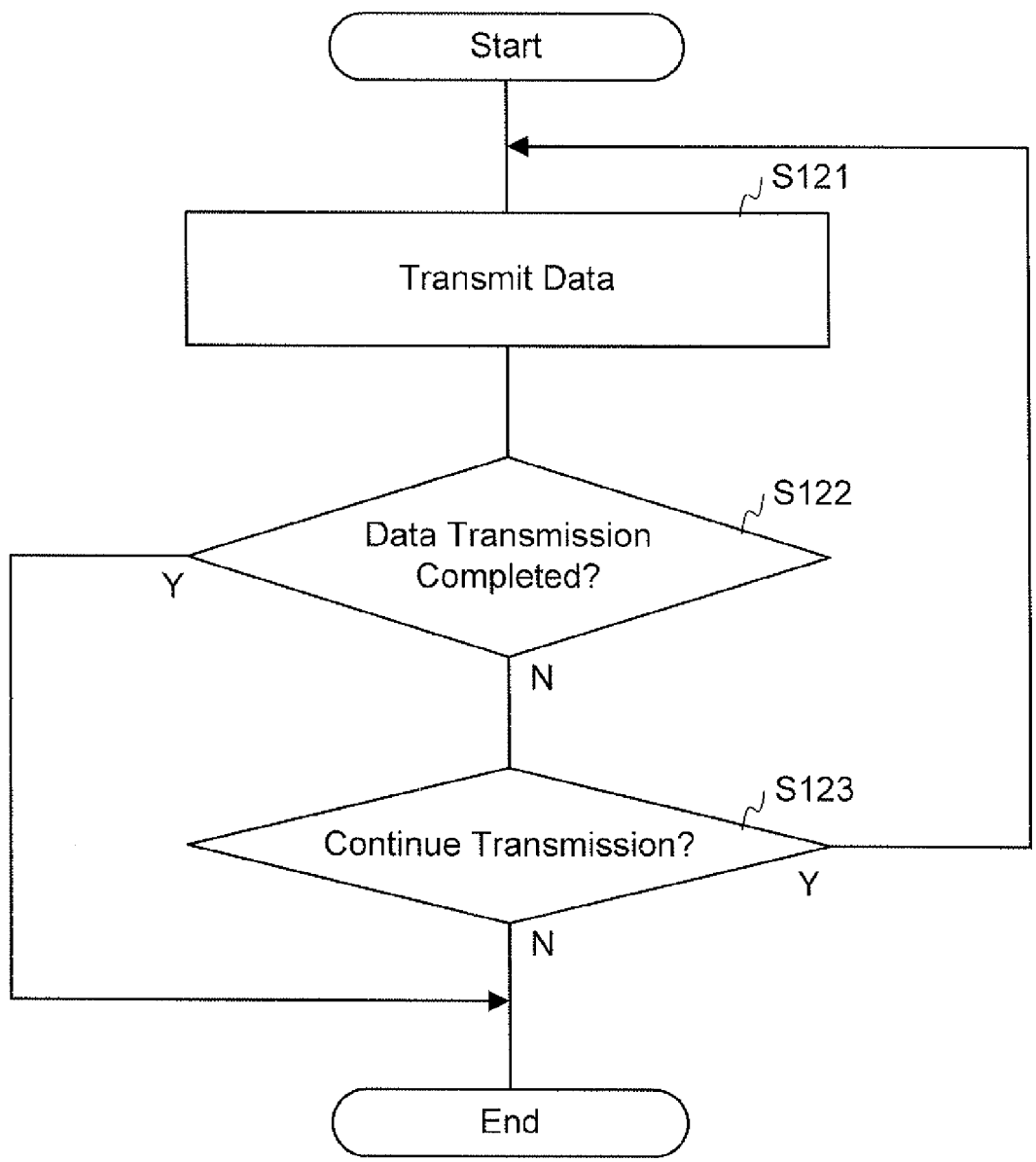
FIG. 8 is a flow diagram of data transmission process according to the first embodiment.

In FIG. 8, at S121, the command transmitting and receiving control unit 111 transmits the set of commands that are generated by the command generation unit 109 to the target printer. In this process, the commands (or command data) in the group are continuously transmitted according to a single instruction. During the transmission, a transmission check for each command is not conducted.

At S122, it is determined whether or not the data transmission at S121 is completed. When the transmission is completed (all commands are successfully transmitted), the process ends. When an error occurs at the time of the transmission, the process goes to S123 where it is determined whether or not the command transmission is continued. In other words, when a transmission error occurs during the command transmission, the occurrence of an error is displayed at the display unit of the PC 100. At the same time, a user is asked to instruct whether the transmission of the command data in which the error occurs is to be continued. When the user responds affirmatively, the processing proceeds to S121. When the user responds negatively, the transmission ends.

When deciding to continue the transmission of the command data, the user instructs the continuation with the input device after the user resolves the cause of the error. When the continuation of the transmission is instructed, the processing of S121-S123 is repeated so that the command data in which the error occurs is re-transmitted. When the transmission is stopped, the user instructs that the transmission be stopped with the input device so that this processing ends.

Figure 10A:
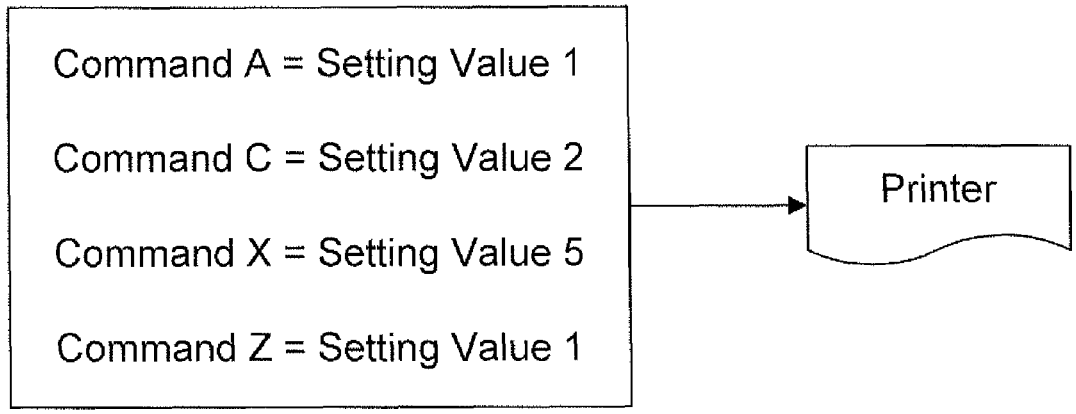
FIGS. 10A and 10B are schematic views of transmission methods of command data.
Figure 10B:
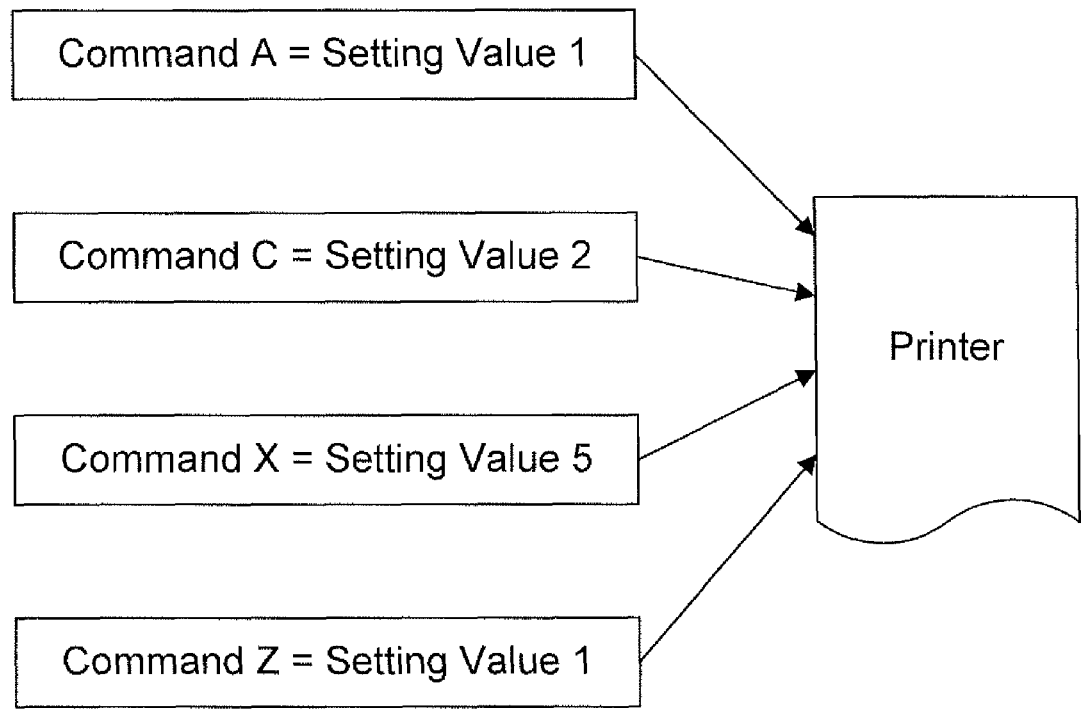

Next, referring to FIGS. 10A and 10B, a method of transmitting command data in the data transmission process at S121 is explained. FIG. 10A is a method of transmitting all commands (commands A, C, X, and Z) in a block according to a single transmission instruction and performing transmission check after the transmission. FIG. 10B is a method of transmitting commands in a command unit without a transmission check for each command transmission so that each command is continuously transmitted as long as a printer can receive the commands.

As discussed above, in the present embodiment, a set of commands is transmitted in a block (or together) as a series of data according to a single transmission instruction in a manner similar to direct memory access (DMA) transfer. A transmission check is only performed if necessary after the transmission of all data is completed. Therefore, data transmission is effectively performed.

In the first embodiment, a control program that corresponds to device information obtained from a target device to be controlled is automatically selected within control programs stored in advance in a memory unit and is executed. Therefore, a user can control (for example, change of various setting values, such as a setting for a sheet size, a selection of a sheet tray, and a setting for density) the target device with simple operation by specifying the device to be controlled. When a printer control program definition file is updated, and when a printer control program is added, a completely new device that has a different specification can easily be controlled. Because a set of commands is transmitted together to the device without a transmission check according to one transmission instruction at the time of data transmission with command control, effective data communication is performed.

Second Embodiment

Figure 11:
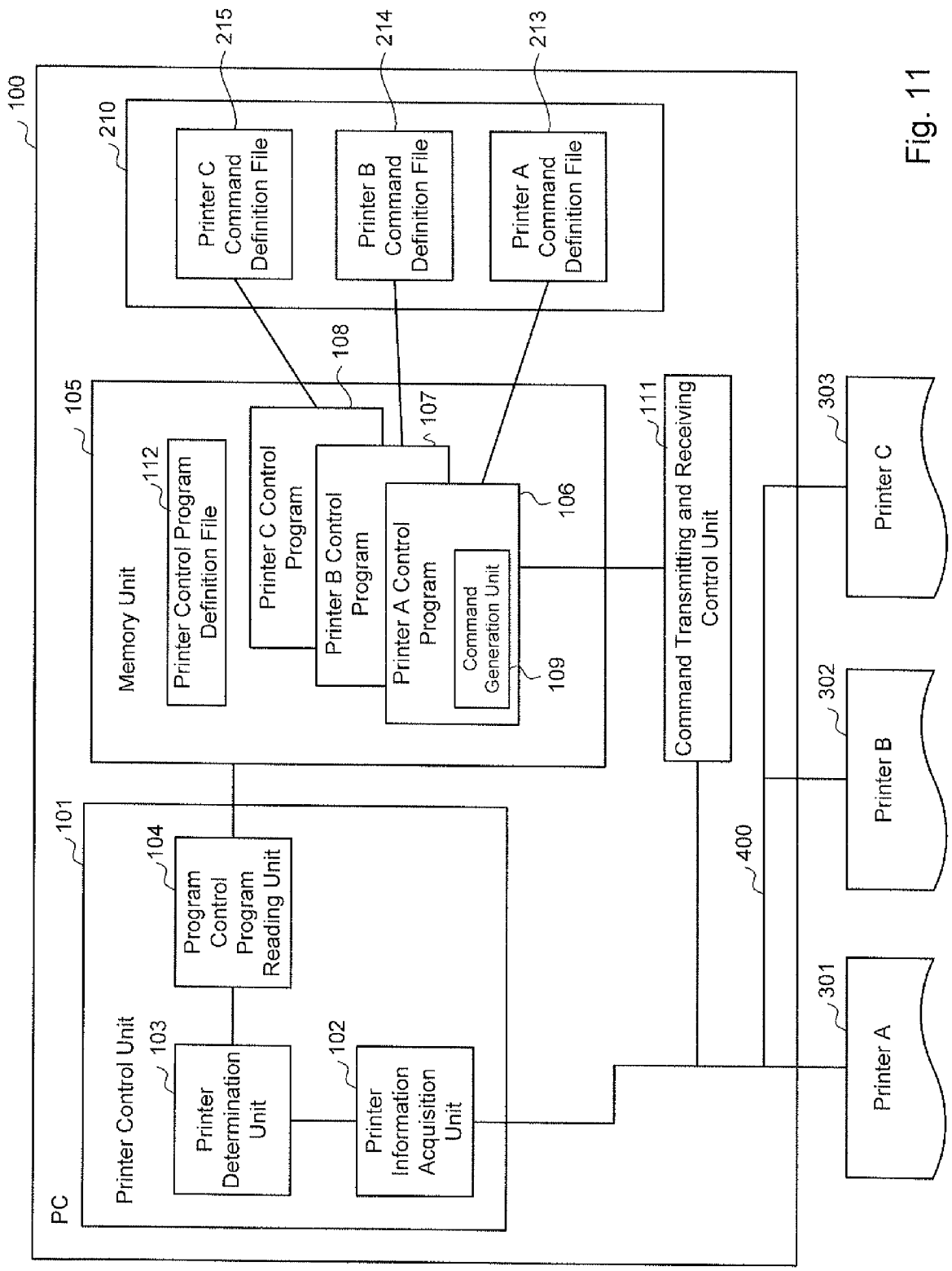
FIG. 11 is a block diagram of an information processing system according to a second embodiment.

In FIG. 11, the configuration of the information processing device, or PC, 100 according to the present embodiment is substantially same as that of the first embodiment (FIG. 1). In the first embodiment, each of the printer control programs (106-108) that are stored in the memory unit 105 has the command generation unit 109 and the command definition data 110. However, in the second embodiment (FIG. 11), the following are different from the first embodiment: Each of the printer control programs (106-108) has only the command generation unit 109, and a part that corresponds to each command definition data 110 is stored as a printer command definition file in a command memory unit 210 that is different from the memory unit 105. Elements in the second embodiment that are same as corresponding elements of the first embodiment have the same reference numerals, and a detailed explanation for them is omitted.

Command definition files (213-215) for controlling each of printers (301-303) are stored in the command memory unit 210. The command definition files (213-215) are definition files that correspond to each printer and are referred to when the printer control programs (106-108) are executed (at the time of command generation).

FIG. 13 is a schematic view of the configuration of the command definition files 213-215. As an example, each printer setting value is sorted into "Setting Value Group 1" and "Setting Value Group 2." In the setting value groups 1 and 2, plural commands (CMD1-CMD3) are listed (stored), respectively. Each of the commands CDM1-CDM3 includes a "Type" showing a type (control method) of a command, with a "Name" showing a function of a command, and with a "Command" showing a command itself.

The data of each of the command definition files 213-215 may vary according to the specification of the printer to be controlled. For example, the "command" for the setting value groups 1 and 2 is configured with combined data of a command and setting value (for example, a setting for a sheet size, a selection of a sheet tray, and a setting for density). Any command format is acceptable as long as the printer control program can see the commands.

Next, performance (changing on a printer setting value as the same manner of the first embodiment) of command control according to the second embodiment is explained. Because basic processing of the printer control unit 101 in the second embodiment is same as the first embodiment (FIG. 6), its explanation is omitted. A printer control process in which the performance is different from that of the first embodiment is explained based on FIG. 12. The following process is performed by executing a printer control program (2) that is loaded in a program expansion area E.

Figure 12:
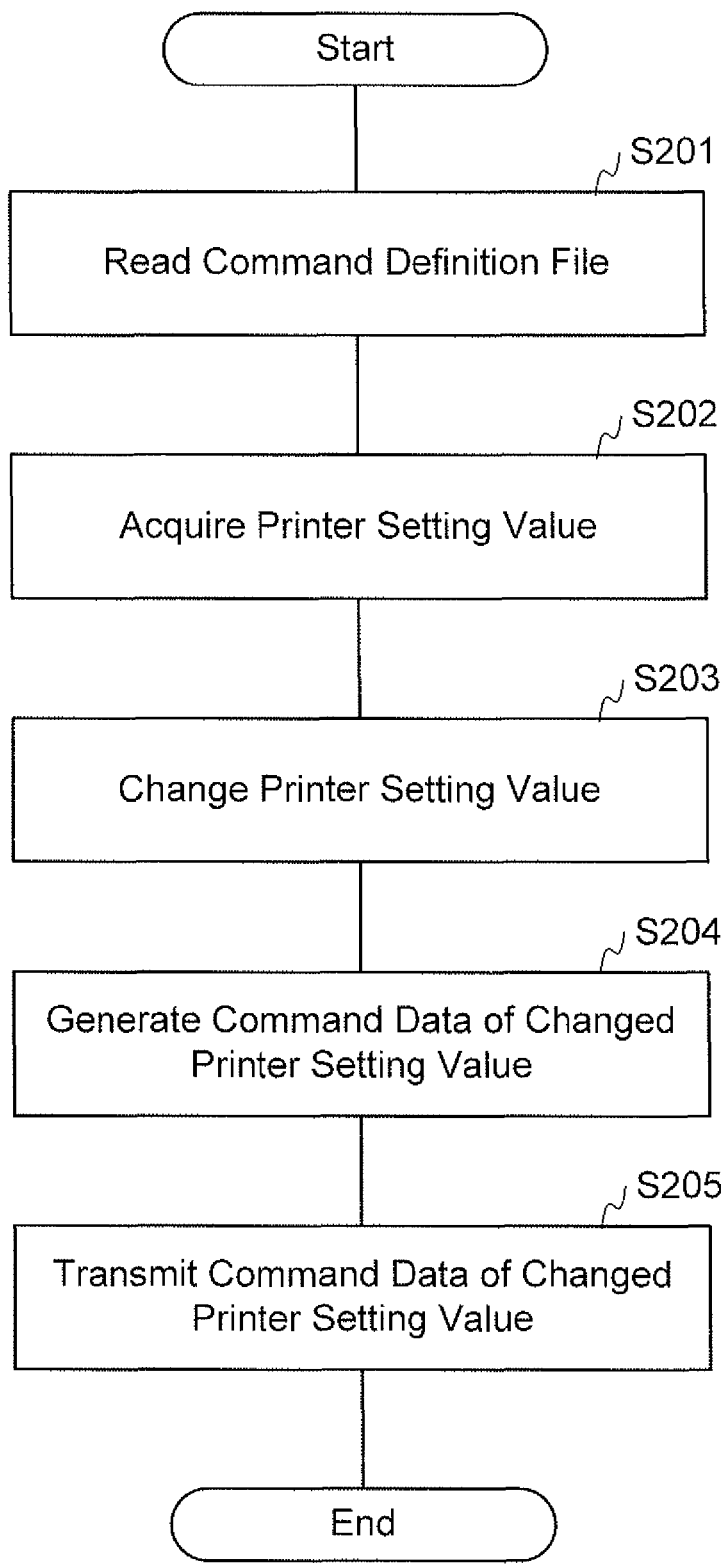
FIG. 12 is a flow diagram of a process of a printer control unit according to the second embodiment.

In FIG. 12, first at S201, the command definition files 213-215 that correspond to a target printer to be controlled are read from the command memory unit 210.

At S202, the printer information acquisition unit 102 acquires a current printer setting value from the target printer.

At S203, the setting value acquired at S202 is displayed at the display unit of the PC 100 so that the user can change the displayed setting value with the input device (a mouse or keyboard).

At S204, the command generation unit 109 generates command data (see FIG. 9) for the change of a printer setting value based on information of the setting value that is changed at S203 with reference to the command definition files 213-215 that are read at S201.

At S205, after the command transmitting and receiving control unit 111 transmits the command data that is generated at S204 to the target printer, the process ends.

Because transmission process for the changed command is same as that of the first embodiment (FIG. 8), its explanation is omitted. Note that, in the second embodiment, because a series of commands are continuously transmitted together according to one transmission instruction, a transmission check for each command is not performed.

In the second embodiment, a control program 106, 107, and 108 that corresponds to device information obtained from a target device to be controlled is automatically selected within control programs stored in advance in a memory unit 105 and is executed. Therefore, a user can control (for example, change various setting values, such as a setting for a sheet size, a selection of a sheet tray, and a setting for density) the target device with simple operation by specifying the device to be controlled.

Each command definition file that is referred to in printer control is stored in the command memory unit 210 in a block as opposed to the first embodiment. When a user wants to perform new command control, it is not necessary to newly add a printer control program with a large capacity as in the first embodiment. It is sufficient to exchange a definition file with a small capacity as updated information. Therefore, the updating task is relatively easy. When the update information is acquired through Internet, only a device definition file is downloaded so that the communication time is relatively short.

In either embodiment, the following devices can be used in addition to a printer: a network capable projector, a scanner, a digital camera, a digital video camcorder, a personal computer, a personal digital assistant (PDA), a network storage, an audio instrument, a cellular phone, a personal handy-phone system (PHS), a watch type PDA, a set top box (STB), a point of sale (POS) terminal, a multi function printer (MFP), a facsimile machine, a telephone (including an IP phone), a switching equipment, a network control unit (NCU), a router, a hub, a bridge, and other network capable devices.

The information processing device being thus described, it will be apparent that the same may be varied in many ways. Such variations are not to be regarded as a departure from the spirit and scope of the invention, and all such modifications as would be apparent to one of ordinary skill in the art are intended to be included within the scope of the following claims.

What is claimed is:

1. An information processing device that transmits and receives information to and from plural devices that are coupled to the information processing device, comprising:
    a memory unit storing a printer control program that corresponds to each of the devices;
    a determination unit for determining whether printer control features of a selected one of the devices are controllable based on device information;
    a reading unit for reading the printer control program from the memory unit that corresponds to the selected device, if the determination unit determines that the selected device is controllable;
    a command generation unit for generating commands for the printer control features of the selected device using the printer control program read by the reading unit; and
    a transmission control unit for transmitting commands generated by the command generation unit to a corresponding device, wherein the transmission control unit transmits the commands generated by the command generation unit.

2. The information processing device according to claim 1, wherein the commands are for changing a setting value of the device.

3. The information processing device according to claim 1, wherein the set of commands is transmitted without interruption by a process to determine whether the transmission was successful.

4. The information processing device according to claim 1, further comprising:
    an acquisition unit for acquiring the device information from the selected device.

5. The information processing device according to claim 1, wherein
    the transmission control unit transmits a set of the commands.

6. The information processing device according to claim 1, wherein
the transmission control unit transmits the commands in a block.

7. The information processing device according to claim 1, wherein
the transmission control unit transmits the commands for the printer control features generated by the command generation unit in a single block as an uninterrupted direct memory transfer.

8. The information processing device according to claim 1, wherein
the printer control program that corresponds to the selected device is loaded in a program expansion area when the printer control features of the selected device are controllable, and
a printer control program that corresponds to a newly selected device is loaded over the previously loaded printer control program in the program expansion area.

9. The information processing device according to claim 1, wherein
the transmission control unit performs a transmission check after the transmission of the commands.

10. The information processing device according to claim 1, wherein
the determination unit determines whether or not the printer control features of the selected device are controllable based on whether or not the printer control program that corresponds to the selected device is stored in the memory unit.

11. An information processing device that transmits and receives information to and from plural devices that are coupled to the information processing device, comprising:
a memory unit for storing printer control programs that correspond to each of the devices;
a command memory unit for storing command sets that correspond to each of the devices;
a determination unit for determining whether printer control features of a selected one of the devices are controllable based on device information;
a reading unit for reading one of the printer control programs from the memory unit and one of the command sets from the command memory unit that correspond to the selected device, if the determination unit determines that the selected device is controllable;
a command generation unit for generating commands for the printer control features of the selected device using the printer control program and command set that are read by the reading unit; and
a transmission control unit for transmitting the commands generated by the command generation unit to a corresponding device, wherein
the transmission control unit transmits a set of commands generated by the command generation unit.

12. The information processing device according to claim 11, wherein the commands are for changing a setting value of the device.

13. The information processing device according to claim 11, wherein the set of commands is transmitted without interruption by a process to determine whether the transmission was successful.

14. A method of operating an information processing device that transmits and receives information to and from plural devices that are connected to the information processing device, wherein the method comprises:
storing a printer control program that corresponds to each of the devices in a memory unit;
determining whether printer control features of a selected one of the devices are controllable based on the acquired device information;
reading the printer control program that corresponds to the selected device from a memory unit, if the determination unit determines that the selected device is controllable;
generating commands for the selected device; and
transmitting the generated commands to a corresponding device.

15. The method of operating the information processing device according to claim 14, wherein the set of commands is transmitted without interruption by a process to determine whether the transmission was successful.

* * * * *